Nov. 17, 1970

S. RAMSEIER 3,540,298

BINARY ADJUSTING MECHANISM

Filed May 7, 1969

INVENTOR.
SERGE RAMSEIER
BY
AGENT

United States Patent Office 3,540,298
Patented Nov. 17, 1970

3,540,298
BINARY ADJUSTING MECHANISM
Serge Ramseier, Carouge-Geneve, Switzerland, assignor to U.S. Philips Corporation, New York, N.Y., a corporation of Delaware
Filed May 7, 1969, Ser. No. 822,544
Claims priority, application Netherlands, May 8, 1968, 6806451
Int. Cl. F16h *21/40;* M04l *15/24*
U.S. Cl. 74—89.17                        11 Claims

ABSTRACT OF THE DISCLOSURE

A binary adjusting mechanism for moving machine components to each of two positions. A reciprocating catch is positioned adjacent two cams and between two electromagnets such that upon activation of either of the electromagnets the catch will be attracted thereto and displaced from its original location to engage and move one of the two cams. This cam movement is transmitted to the machine element.

---

Figure 1:
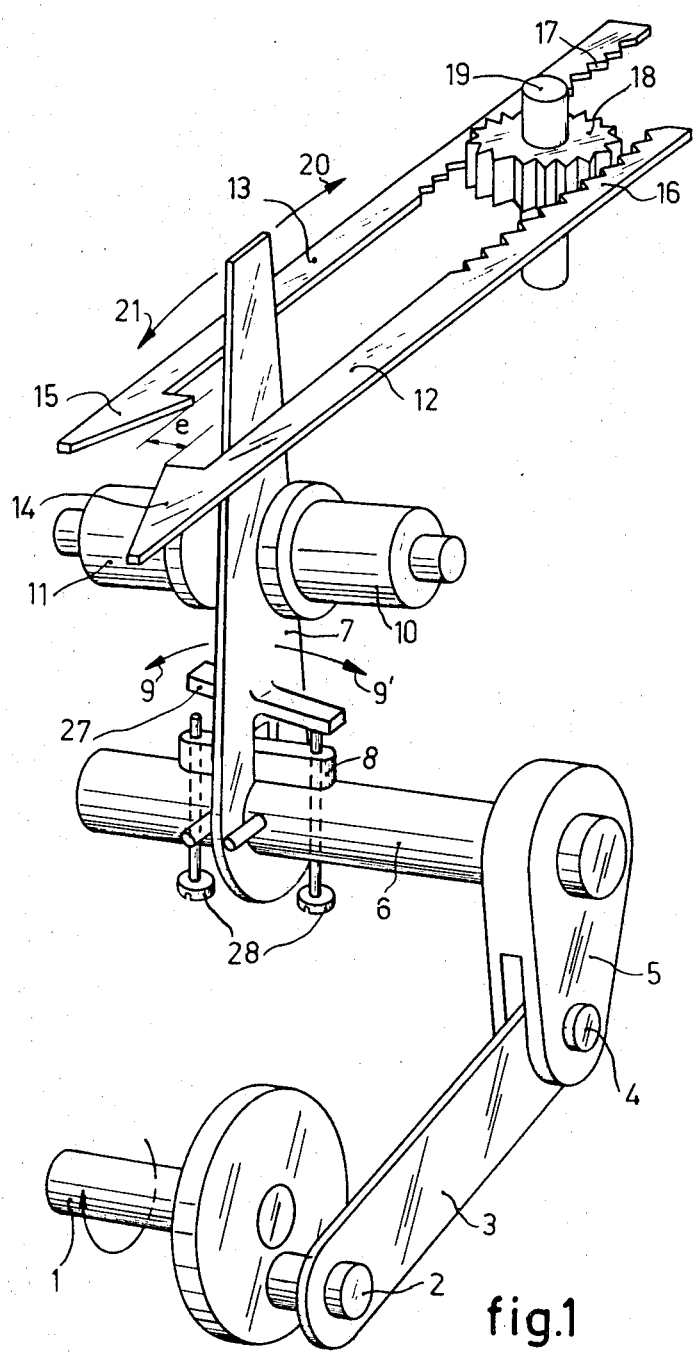

The invention relates to a binary adjusting mechanism for bringing a machine component to be adjusted in one of two given positions.

Similar adjusting mechanisms which, on the basis of information present in a binary coded form, bring machine components, for example, type supports of printing devices, in a given desired position are known. Because each of the adjusting mechanisms gives only two output positions, several of these adjusting mechanisms are usually used in a combined form in which their output positions are superimposed mechanically.

A drawback of known adjusting mechanisms of the type to which the present invention relates, is their complicated construction, as a result of which said known mechanisms are expensive, while, particularly at high speeds, they produce much noise and are subject to detrition.

It is the object of the invention to provide a simple, cheap, low-noise, and long-life construction of an adjusting mechanism.

In order to realize this, the adjusting mechanism according to the invention is characterized in that it is formed by a catch which is coupled to a driving device, is constantly performing a reciprocating movement and can be displaced at right angles to its direction of movement, an electromagnet being arranged on at least one side of said catch and adapted to displace said catch at right angles to its direction of movement, said catch being limited in each of its two directions of displacement by one side of a movable element which extends in the direction of movement of the catch, each of the said elements being provided on the said side with a cam which is shaped so that the catch takes along said cam and the element connected thereto only when it is moved in its one direction, each of the movable elements being coupled through a transmission to the machine component to be adjusted.

The electric control signal applied to the electromagnets in the device according to the invention can be small because it serves only to displace the catch at right angles to its direction of movement from its one position to its other position. The adjustment of the out-going shaft is then effected by the driving device of the catch.

The adjusting mechanism according to the invention hence fulfils as it were two functions simultaneously, namely the actual adjustment of the machine component and the mechanical intensification of the electric control signal.

A further favourable embodiment of the adjusting mechanism according to the invention is characterized in that the catch is formed by an elongate, plate-shaped structral component, which with its one side is rigidly secured, in the direction of movement, to a rockshaft which is connected, through a transmission mechanism, to the crank of a further crank shaft which is coupled to a driving device, the elongate, plate-shaped structural component being resilient in the direction at right angles to its direction of movement, or is secured to the said shaft so as to be tiltable in the said direction.

In this manner a very simple and reliable catch construction is obtained.

According to a further embodiment, an electromagnet and a movable element are arranged on either side of the catch, the sides facing each other of the two movable elements being provided with a cam which is constructed so that they can both be taken along by the catch in the same direction.

In this case the electromagnets may be rigidly secured or be secured to the rockshaft in such manner that they move with the catch.

In order to prevent the catch from performing uncontrolled tilting movements, for example, as a result of vibrations, according to a further embodiment of the invention, the side of each of the cams cooperating with the catch is provided with a recess in which the catch engages in such manner that the catch is locked against movements at right angles to its direction of movement.

According to a further embodiment of the adjusting mechanism according to the invention, the movable elements are constituted by an elongate, rod shaped body which comprise at their one end the said cams and at their other end cooperate, through a transmission by toothed rack, chain, cable or belt, with a toothed wheel or guide drum on a shaft to be adjusted. In this case the stroke of the catch and the location of the cams on each of the rod-shaped bodies are chosen to be so that each of the said bodies is taken along by the catch over a distance which corresponds to half the circumference of the pitch circle of the tooth wheel or half of the circumference of the guide drum.

In another embodiment, the movable elements are constituted by a chain or belt on which the cams are provided and which is guided on one side by a wheel or drum on an auxiliary shaft and on the other side by a wheel or drum on a shaft to be adjusted. In order to prevent the catch from contacting the two studs on the movable elements simultaneously, which might result in damage to the mechanism, according to a further embodiment of the adjusting mechanism acording to the invention, the extremities of the two cams are movable in two parallel planes which are situated at a distance from each other which is at least equal to the dimension of the catch in the direction at right angles to the said planes.

In order to prevent the catch from experiencing friction during its reciprocating movement, either by the movable elements or by the electromagnets, according to a further embodiment of the mechanism according to the invention, stop members which may be adjustable are provided so as to move with the rockshaft, said stop members ensuring that the catch does not contact the movable elements of the electromagnets.

Figure 2:
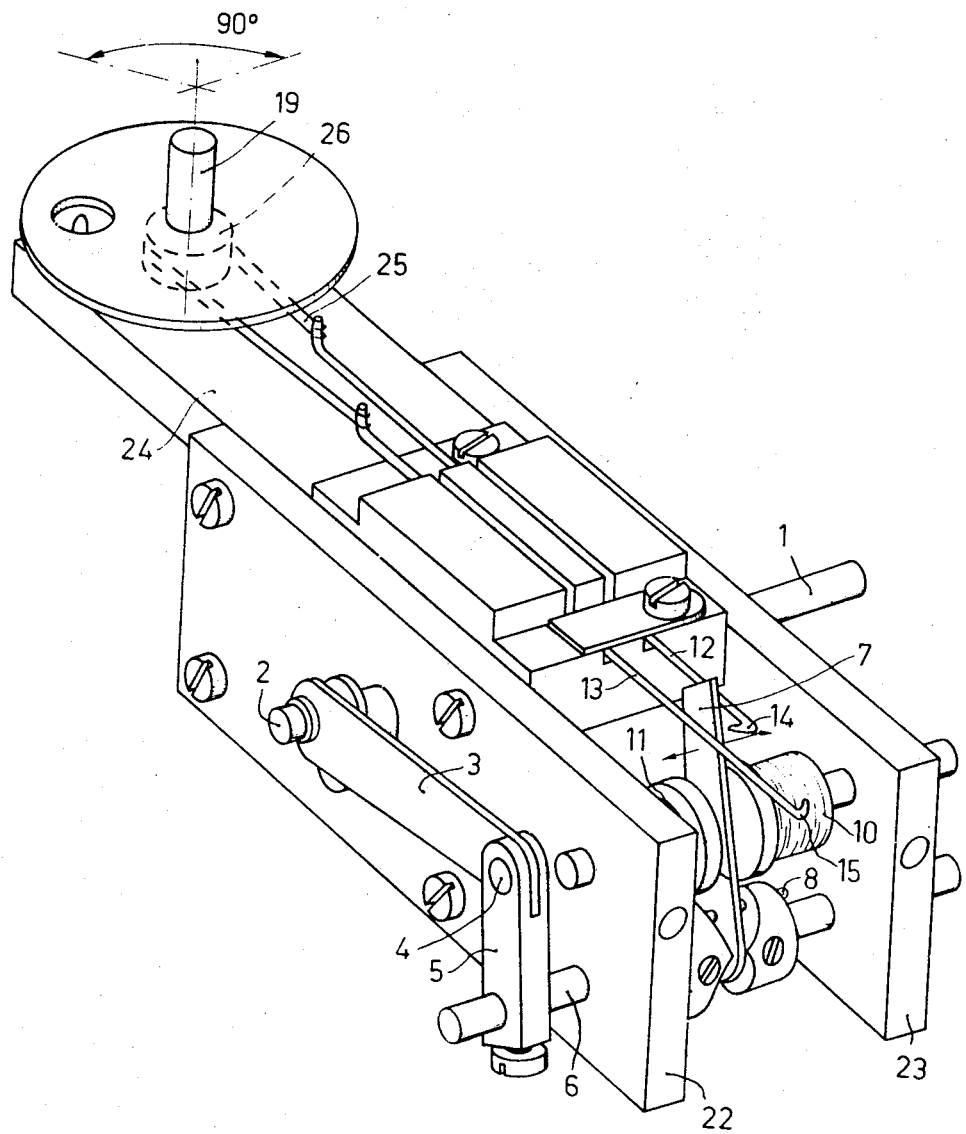

In order that the invention may be readily carried into effect, a few examples thereof will now be described in greater detail, by way of example, with reference to the accompanying drawings, in which FIGS. 1 and 2 diagrammatically show embodiments of an adjusting mechanism.

Figure 3:
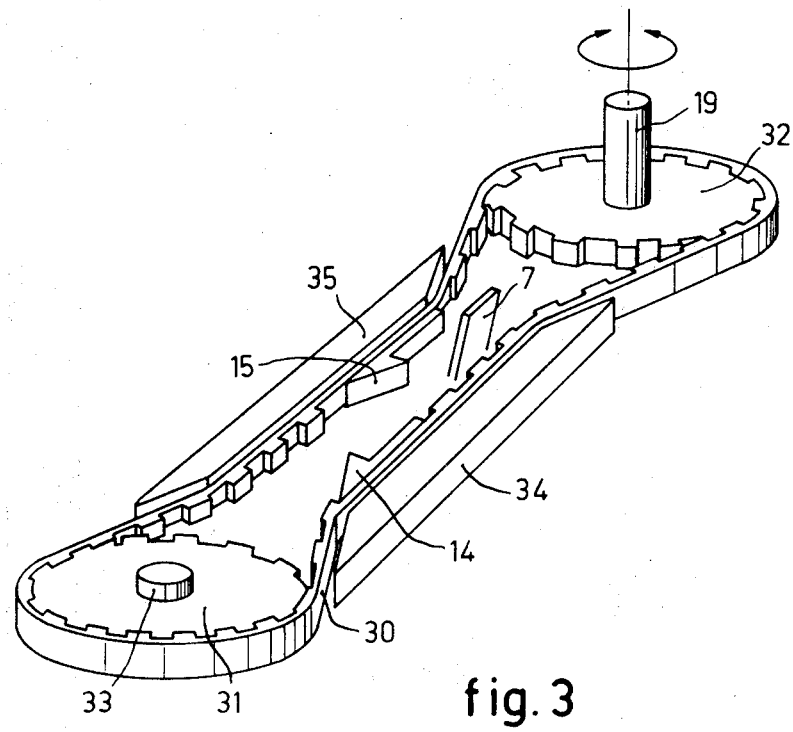

FIG. 3 diagrammatically shows a part of an adjusting mechanism in which a cammed chain is guided over a wheel on the shaft to be adjusted and a wheel on an auxiliary shaft.

Figure 6:
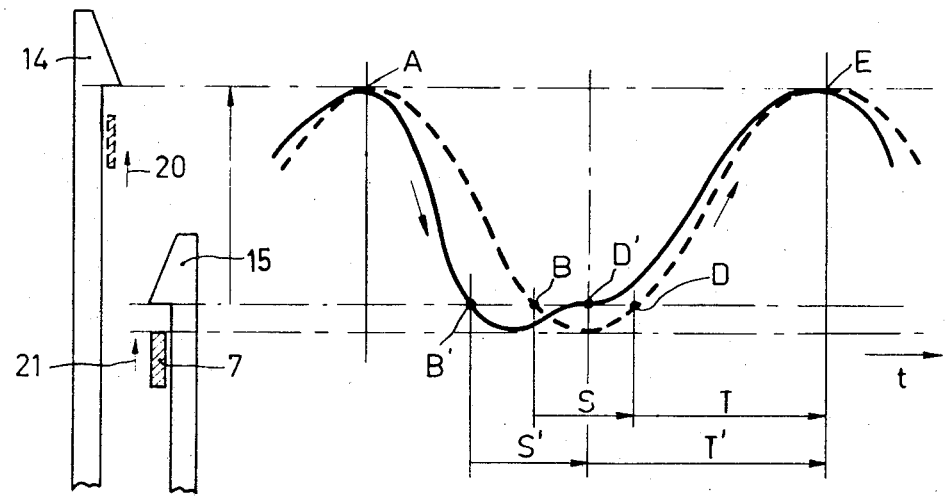
Figure 4:
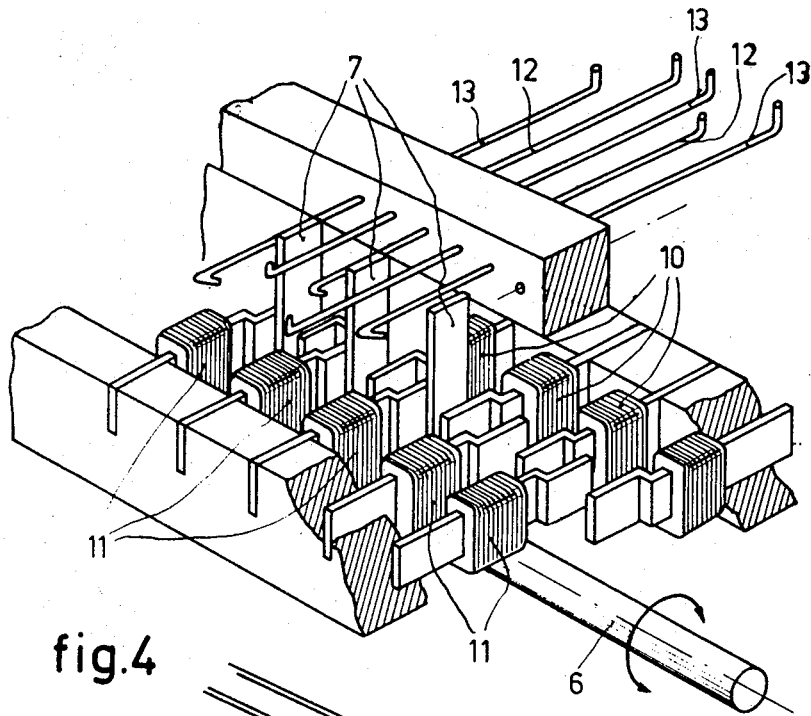
Figure 5:
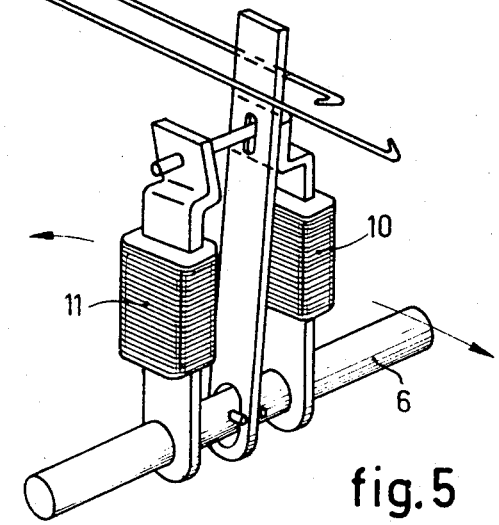
Figure 7:
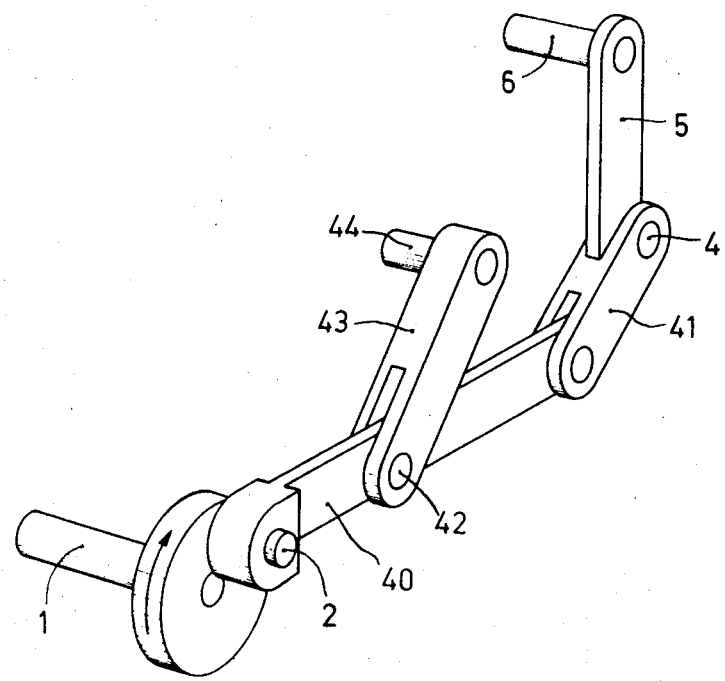

FIG. 4 diagrammatically shows a part of a device which comprises a number of adjusting mechanisms shown in FIG. 2, FIG. 5 shows a part of an adjusting mechanism in which the electromagnets move with the catch, FIGS. 6 and 7 diagrammatically show a transmission mechanism for the coupling between the driving shaft and the rockshaft, the resulting movement of the catch being shown as a function of time.

FIG. 1 diagrammatically shows an adjusting mechanism. In this figure, a shaft 1 can be coupled to a driving device (not shown), for example, an electric motor. This shaft 1 comprises a crank pin 2 which, through a driving rod 3, is coupled to the crank pin 4 of a crank 5 of the crank shaft 6. Since the crank radius of crank pin 2 is smaller than that of crank pin 4, the shaft 6 will perform a rocking movement when the shaft 1 rotates. A catch 7 is secured to the shaft 6 in such manner that the catch 7 is rigidly secured to the shaft 6 in its direction of movement by the wedge 8, but can be tilted at right angles thereto, so in the directions 9–9′. Electromagnets 10 and 11 are arranged on either side of the catch 7. Furthermore, the movable rod-shaped elements 12 and 13 are arranged on either side of the catch 7 and are provided at their one end with cams 14 and 15 which are constructed so that the catch takes along the elements 12 and 13 only in its one direction of movement. At their other end, the elements 12 and 13 comprise toothed racks 16 and 17 which cooperate with a toothed wheel 18 on the shaft 19 to be adjusted. The catch 7 is provided with surfaces 27 which cooperate with stop screws 28 which are arranged in the rockshaft. By the correct adjustment of the screws 18, the catch 7 is restricted in its tilting movement 9–9′ in such manner that the catch 7 cannot contact the elements 12 and 13 and the electromagnets 10 and 11. In this manner it is not possible that any friction occurs between the catch 7 and the said components.

The distance $e$ between the ends of the cams 14 and 15 exceeds the thickness of the catch 7, so that the catch 7, so that the catch 7 can never take along the two cams 14 and 15 simultaneously.

The operation of this adjusting mechanism is as follows: the shaft 1 is continuously driven so that the shaft 6 performs a rocking motion and so does the catch 7 whih is secured to said shaft. As a result of the control signal either the electromagnet 10 or the electromagnet 11 is energized. As a result of this the catch 7 is tilted in the direction 9′ or in the direction 9. In FIG. 1 the catch 7 is shown in the position tilted in the direction 9′. When during the stroke of the catch in the direction 20 the electromagnet 11 is energized, the catch is tilted in the direction 9. At the end of its stroke, the catch is situated behind the cam 15. During the next stroke of the catch 7 in the direction 21, the catch takes along the element 13. Through the toothed rack transmission, the shaft 19 is rotated, while the element 12 is displaced in a direction opposite to that of the element 13.

In this device the control signal, namely the energisation of the electromagnets, only serves for tilting the catch, the power required for displacing the other elements being supplied by the driving device coupled to the shaft 1. As a result of this a small control signal is sufficient. The stroke of the catch 7 in the directions 20 and 21, as well as the position of the cams 15 and 14 are chosen to be so that the elements 12 and 13, respectively, are always moved over a distance which corresponds to half the circumference of the pitch circle of the toothed wheel 18 so that the shaft 19 performs a rotation of 180°. If desirable, it is alternatively possible to displace the shaft 19 over an angle smaller than 180°.

FIG. 2 shows an embodiment of the adjusting mechanism which differs slightly from that shown in FIG. 1. In this embodiment the shafts 1 and 6 are journalled in two plates 22 and 23 to which the electromagnets 10 and 11 are also secured. A guide 24 for the movable rods 12 and 13 is present between the plates 22 and 23, in which guide the shaft 19 to be adjusted is also journalled. The coupling between the rods 12 and 13 and the shaft 19 is formed by a belt 25 which at one end is secured to the rod 12 and at its other end is secured to the rod 13. This belt 25 is guided around a drum 26 on the shaft 19. In this embodiment the electromagnets 10 and 11 are rigidly secured. In order to prevent the catch 7 from tilting in an undesired manner, the cams 14 and 15 are provided with recesses which, when the catch engages the said recesses, prevent the catch from being tilted.

FIG. 3 diagrammatically shows how instead of the rods 12 and 13 with their associated toothed rack 16, 17, or belt transmission 25, 26, a chain 30 with sprocket wheels 31 and 32 can be used. The sprocket wheel 31 is arranged on an auxiliary shaft 33 while the sprocket wheel 32 is secured to the start 19 to be adjusted. The cams 14 and 15 are provided on the chain 30 while the catch 7 is situated in between. On the outside the chain 30 is guided by guides 34 and 35. It will be obvious that instead of a chain an endless belt, for example, of metal, may alternatively be used, in which case it is guided by two belt drums instead of the sprocket wheels.

FIG. 4 shows a part of a device which comprises several adjusting mechanisms as shown in FIG. 2. In this embodiment a plurality of catches are provided on the shaft 6. Electromagnets 10 and 11 are arranged on either side of each of the catches 7, each catch cooperating with a pair of movable rods 12 and 13. In this manner a very compact device with a plurality of adjusting mechanisms is obtained.

In the mechanism shown in FIGS. 2 and 4, the electromagnets 10 and 11 are rigidly secured. It is shown diagrammatically in FIG. 5 how the electromagnets 10 and 11 can move with the catch 7. For that purpose the magnets are arranged on the shaft 6 so that they also perform the rocking motion of said shaft.

When the transmission mechanism between the crank shaft 1 coupled to the driving device and the rockshaft 6 is constructed as a normal crank driving rod mechanism as is shown in FIG. 1, the catch 7 will perform a sinusoidal movement. This movement is shown in FIG. 6 by a broken line. At points A and E the catch 7 is in its extreme outward position. At point B, the catch is just at the height of the working surface of the cam 15. Between B and D, the catch 7 is behind the cam 15. This means that in this interval the tilting of the catch can be carried out. At D, the catch 7 will contact the cam 15 and take it along. A drawback of this transmission mechanism is that at point D the catch has already speed and engages the cam 15 with a shock. The time S during which the catch 7 is situated behind the cam 15 is given by the speed with which tilting takes place. For given electromagnets, this time is fixed. If a large frequency is desirable and the same time S is to be maintained, this can be done only by choosing the amplitude of the movement of the catch to be larger. This means, however, that the speed of the cath at point D then becomes larger so that also the shock with which the catch hits the cam increases.

In order to avoid this drawback a transmission mechanism as shown diagrammatically in FIG. 7 may be used. In this embodiment the crank pin 2 is connected to a first rod 40 which at its other end is pivotally secured to the second rod 41 which in turn is connected to a crank pin 4 of crank 5 of the rockshaft 6. Rod 40 is furthermore pivotally secured to a crank 43 on the shaft 44 at point 42. Like the shafts 1 and 6, the shaft 44 is journalled in the frame of the device. With this transmission mechanism a movement is imparted to the catch 7 which in FIG. 6 is shown by the solid line. From this figure it may be seen that the interval S′ has remained equal to the interval S of the crank driving shaft mechanism. This interval S′, however, is shifted with respect to S and that in that sense that now the interval D′E, i.e. the interval in which the catch takes along the cam 15, is longer than the intervals DE in the crank driving rod mechanism. A very important feature is furthermore that now at point D'S the speed of the catch 7 is zero which means that at the instant of the contact of the catch with the cam 15 no shock will occur. The parts D'E of the curve has a full sinusoidal form. Since the interval AB' has become smaller, the catch has, as it were, obtained an increased return. With this transmission mechanism the adjusting mechanism can operate at high speeds without shocks and wear occurring.

It may be obvious from the above that the invention provides an adjusting mechanism of a simple construction in which an electromechanical intensification of the control signal takes place so that the latter may be small.

What is claimed is:

1. A binary adjusting mechanism for moving a machine component to one of two positions comprising a drive means, a rockshaft coupled to the drive means for reciprocal movement, a catch member mounted on the rockshaft for reciprocal movement therewith, at least one electromagnet placed adjacent the catch member and adapted to attract and thereby displace the catch member in a direction normal to the path of reciprocal movement, at least one connecting member having a cam engaged by the catch member when in the displaced position to move the connecting member in one direction, said movement being transmitted to the machine component.

2. A binary adjusting mechanism as claimed in claim 1, wherein the rockshaft is reciprocated about its longitudinal axis.

3. A binary adjusting mechanism as claimed in claim 2, wherein the catch member is rigidly mounted to the rockshaft in the direction of the reciprocal movement and pivotally mounted to the rockshaft in the direction normal to the direction of reciprocal movement.

4. A binary adjusting mechanism as claimed in claim 3, further comprising stop members affixed to the rockshaft on either side of the catch member for limiting the movement of the catch member in a direction normal to the direction of reciprocal movement and for preventing the catch member from contacting the electromagnet.

5. A binary adjusting mechanism as claimed in claim 4, wherein an electromagnet is placed on each side of the catch member, and a connecting member having a cam is correspondingly placed on each side of the catch member.

6. A binary adjusting mechanism as claimed in claim 5, wherein each of the cams is movable in separate parallel planes which are spaced from each other a distance which is great enough to permit passage of the catch member therebetween but which will engage the catch member if same has been displaced by the electromagnetic attraction.

7. A binary adjusting mechanism as claimed in claim 6, wherein the connecting member is formed of an elongate rod-shaped body.

8. A binary adjusting mechanism as claimed in claim 6, wherein the connecting member is formed of a belt on which cams are provided.

9. A binary adjusting mechanism as claimed in claim 7, wherein the catch member is an elongate plate-shape element.

10. A binary adjusting mechanism as claimed in claim 9, wherein the electromagnets are rigidly secured to the rockshaft.

11. A binary adjusting mechanism as claimed in claim 10, wherein the rockshaft is coupled to the drive means by a first rod affixed at one end to the crank of a drive shaft and at the other end pivotally secured to a second rod which in turn is pivotally secured to the crank of the rockshaft, the first rod is at an intermediate point further secured to a secondary crank and crank shaft so as to reduce the speed of the catch member to zero at the instant it contacts the cam.

References Cited

UNITED STATES PATENTS

| 2,859,628 | 11/1958 | Arko | 74—422 |
|---|---|---|---|
| 2,900,848 | 8/1959 | Henn-Collins | 178—34 |
| 3,295,652 | 1/1967 | Sasaki | 178—34 |
| 3,337,019 | 8/1967 | Sasaki | 178—34 |

WESLEY S. RATLIFF, JR., Primary Examiner

U.S. Cl. X.R.

178—34; 74—422